Patented Dec. 5, 1933

1,937,671

UNITED STATES PATENT OFFICE

1,937,671

SOLID CONCENTRATES OF VITAMINS AND PROCESS OF MAKING SAME

Atherton Seidell, Washington, D. C.

No Drawing. Application April 15, 1931
Serial No. 530,442

5 Claims. (Cl. 167—81)

In its specific preferred embodiment, my invention relates to a highly concentrated product containing antineuritic vitamin in suitable form for the prevention and cure of diseases arising from deficiency of such vitamins, and to a process of preparing such a product.

In my previous Patent No. 1,173,317, issued Feb. 29, 1916, a process of preparing a solid combination of vitamins by the addition of fuller's earth to a solution prepared from brewers' yeast was disclosed.

By subsequent experiments I have discovered that the vitamins adsorbed by fuller's earth can be removed by extracting the solid combination with aqueous sodium hydroxid solution. Such extracts must, however, be quickly acidified to prevent decomposition of the vitamins. These solutions when slightly acidified wtih sulfuric acid and concentrated by vacuum distillation yield organic precipitates which are especially rich in the vitamin now known as the thermostable growth factor ($B_2$ or G). The filtrate from these precipitates contains principally the vitamin known as the antineuritic factor ($B_1$). There is also present a large amount of sodium sulfate which crystallizes on cooling and is removed by filtration. In order to remove more of the sodium sulfate and other inorganic salts as well as certain organic impurities which are present, about an equal volume of alcohol is added and the resulting precipitate is separated by filtration.

In a specific preferred embodiment of my present invention the new solid concentrated product containing antineuritic vitamin may be obtained by the following procedure:

The filtrate from the above precipitate or a similar vitamin containing solution is evaporated sufficiently to remove the alcohol. It is then diluted with water to the extent that about seven (7) times as much water as organic solids are present. This solution is then benzoylated by the rapid addition of solid sodium carbonate and liquid benzoyl chlorid. Of these reagents there should be used about 1.8 times as much sodium carbonate as there are organic solids in the aqueous solution and about twice as much benzoyl chlorid as sodium carbonate. In the claims the term "benzoylation" is used in the sense in which this term is customarily used in the nomenclature of organic chemistry, namely, to designate a reaction in which a suitable reactive benzoyl compound is utilized under conditions whereby it supplies the benzoyl radical for reaction with other substances present and participtating in the reaction. As a particularly efficient method of effecting this benzoylation and as the best means now known to me for effecting benzoylation for the purpose of the present invention, I have employed benzoyl chloride as a source of the benzoyl radical conjointly with sodium carbonate as just described but I do not limit the scope of my invention to the use of these particular reagents for the purpose of effecting benzoylation.

Upon the addition of benzoyl chloride and sodium carbonate as just described, a vigorous exothermic reaction ensues with foaming of the reacting materials incident to the liberation of carbon dioxide by the reaction, and, subsequent to this reaction, the mixture is allowed to cool and the excess of benzoyl chlorid and various other compounds are removed by extraction with chloroform (or other suitable selective solvent immiscible with water, such as toluene) and the insoluble products are separated by suitable means such as centrifugation or filtration. The precise nature of the benzoylation reaction, which may be and preferably is effected by the use of benzoyl chloride and sodium carbonate as hereinabove described, is not known in all of its details but applicant has discovered that such benzoylation is effective to render the vitaminic and nonvitaminic substances more readily separable from each other by reason of the fact that such benzoylation (regardless of what particular nitrogenous substances present are or may be affected by such benzoylation) facilitates, to a very marked degree, the separation of the vitaminic from the nonvitaminic substances present by the use of a solvent (particularly chloroform which, after the benzoylation, has a highly selective solvent action for the nonvitaminic substances present in the reaction mixture).

The extracted and clarified aqueous solution, after being separated from the chloroform or other immiscible solvent and substances carried in solution by such immiscible solvent, is poured into ten (10) or more volumes of acetone and the precipitate, comprising salts and vitamin, is collected, washed with acetone, and dried.

The washed and dried precipitate thus obtained is extracted by agitation, preferably with a mixture of three (3) volumes of propyl alcohol and one (1) volume of concentrated hydrochloric acid, using about 3.0 cubic centimeters of this mixture per 1.0 gram of the vitamin-containing salts and repeating the extraction a second time. The combined extract is vacuum distilled to about one-tenth of its volume and this solution is added slowly to about thirty (30) times its volume of acetone. The resulting precipitate is separated by centrifugation, dissolved in about ten (10) times its weight of methyl alcohol and this solution is added slowly to about thirty (30) times its volume of acetone.

The precipitate now obtained is separated by centrifugation, agitated with another portion of acetone and again separated by centrifugation. After drying, it consists of a white powder which is characterized by its exceptionally high antineuritic activity. This white powder is non-hygroscopic and is composed of irregularly shaped transparent grains having an index of refraction of approximately 1.56, is soluble in water and in methyl alcohol and contains in each gram at least 10,000 times the quantity of antineuritic vitamin capable of effecting the cure of a rat brought to the polyneuritic state by a diet deficient in this vitamin.

Certain essential features of my present invention have been described by me in the Journal of Biological Chemistry, volume 82 (1929) pages 633 to 640 inclusive, and in Public Health Reports, volume 45 (1930) pages 3194 to 3200.

As certain changes could be made in the process hereinbefore described without departing from the scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention, which, as a matter of language, may be said to fall therebetween.

I claim:—

1. A process of eliminating non-vitaminic nitrogenous and other substances from aqueous vitamin solutions, which comprises the step of subjecting substances contained in such solution to benzoylation of such character as to effect an increase in the differential solubilities of vitaminic and non-vitaminic substances present in the solution.

2. A process of eliminating non-vitaminic nitrogenous and other substances from aqueous vitamin solutions, which comprises subjecting dissolved substances in the solution to benzoylation and then extracting non-vitaminic substances from the aqueous benzoylated mixture by the action of a solvent immiscible with the said aqueous mixtures and having a selective solvent action on such non-vitaminic substances, and separating insoluble residues and the immiscible solvent with its dissolved substances from the aqueous vitaminic solution.

3. A process of obtaining a solid vitamin concentrate from aqueous solutions containing vitamins and associated non-vitaminic nitrogenous and other substances, which comprises the steps: subjecting dissolved substances in the solution to benzoylation, extracting non-vitaminic substances from the aqueous benzoylated mixture by means of a solvent immiscible with the said aqueous mixture having a selective solvent action on such non-vitaminic substances, separating insoluble residues and the immiscible solvent with its dissolved substances from the aqueous vitaminic solution; precipitating simultaneously the vitamin and salts present in the separated aqueous solution, by means of acetone; extracting the vitamin from the precipitated mixture containing the vitamin and accompanying salts by means of a solvent having a selective solvent action for the vitamin; precipitating the vitamin from the solution thus formed by means of acetone; dissolving the vitamin-containing precipitate so obtained in methyl alcohol and re-precipitating the vitamin from this solution by means of acetone.

4. A process of obtaining a solid vitamin concentrate from aqueous solutions containing vitamins and associated non-vitamin nitrogenous and other substances, as defined in claim 3, in which benzoylation is effected by use of benzoyl chlorid and an alkali metal compound reactive therewith, and in which propyl alcohol and hydrochloric acid are used together as the selective solvent for extracting the vitamin from the precipitated mixture containing the vitamin and accompanying salts.

5. A vitamin concentrate consisting of a white, non-hygroscopic powder composed of irregular shaped transparent grains having an index of refraction of approximately 1.56, soluble in water and methyl alcohol, and containing in each gram at least 10,000 times the quantity of antineuritic vitamin capable of effecting the cure of a rat brought to the polyneuritic state by a diet deficient in this vitamin.

ATHERTON SEIDELL.